(12) United States Patent
Kumazawa et al.

(10) Patent No.: US 6,818,580 B2
(45) Date of Patent: Nov. 16, 2004

(54) HONEYCOMB CERAMICS STRUCTURE BODY AND METHOD FOR PRODUCING THE SAME

(75) Inventors: Kazuhiko Kumazawa, Charles Michiels (BE); Yasushi Noguchi, Nagoya (JP); Hideaki Nishi, Toyoake (JP); Hiroyuki Suenobu, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 43 days.

(21) Appl. No.: 10/312,140

(22) PCT Filed: Jun. 27, 2001

(86) PCT No.: PCT/JP01/05491

§ 371 (c)(1),
(2), (4) Date: Dec. 23, 2002

(87) PCT Pub. No.: WO02/02479

PCT Pub. Date: Jan. 10, 2002

(65) Prior Publication Data

US 2003/0166450 A1 Sep. 4, 2003

(30) Foreign Application Priority Data

Jun. 30, 2000 (JP) .................................. 2000-199801
May 25, 2001 (JP) .................................. 2001-157114
Jun. 20, 2001 (JP) .................................. 2001-187245

(51) Int. Cl.⁷ ...................... C04B 35/195; C04B 38/06
(52) U.S. Cl. ................... 501/119; 428/116; 264/43; 264/44; 264/631; 55/523; 55/DIG. 5; 55/DIG. 30
(58) Field of Search .................... 501/9, 119; 428/116; 55/523, DIG. 5, DIG. 30; 264/43, 44, 177.12

(56) References Cited

U.S. PATENT DOCUMENTS 5,545,243 A    8/1996  Kotani et al.
6,254,963 B1 * 7/2001  Kondo .................... 428/116
2003/0024220 A1 * 2/2003  Ishihara et al. ........... 55/523
2003/0143370 A1 * 7/2003  Noguchi et al. .......... 428/116
2003/0165662 A1 * 9/2003  Suwabe et al. ........... 428/116

FOREIGN PATENT DOCUMENTS

| EP | 0753490 | * | 1/1997 |
| EP | 0 761 279 A2 | | 3/1997 |
| JP | B2 7-38930 | | 5/1995 |
| JP | A 8-323123 | | 12/1996 |
| JP | A 9-77573 | | 3/1997 |
| JP | B2 2726616 | | 12/1997 |
| JP | A 11-333293 | | 12/1999 |
| JP | 2000001365 | * | 1/2000 |
| JP | 2000225340 | * | 8/2000 |

* cited by examiner

Primary Examiner—Karl Group
(74) Attorney, Agent, or Firm—Oliff & Berridge, PLC (57) ABSTRACT

A ceramics structure body having chemical composition of 42 to 56 wt % of $SiO_2$, 30 to 45 wt % of $Al_2O_3$ and 12 to 16 wt % of MgO, crystalline phase mainly composed of cordierite, a porosity of 55 to 65%, an average pore size of 15 to 30 μm; and the total area of pores exposed on surfaces of partition walls constituting the honeycomb ceramics structure body being 35% or more of the total area of partition wall surfaces. Fifteen to 25 wt % of graphite and 5 to 15 wt % of a synthetic resin are added as a pore forming agent to a cordierite-forming raw material; the resultant is kneaded and molded into a honeycomb shape; and the resultant is dried and fired to produce above-mentioned honeycomb ceramics structure body. According to this honeycomb ceramics structure body, a low pressure loss and a high collection efficiency can be attained.

10 Claims, 6 Drawing Sheets

COMPARISON OF HEAT FLOW(DTA) AND PERCENT WEIGHT REDUCTION(TG) OF DOUGH CONTAINING STARCH AND THOSE OF DOUGH CONTAINING POLYMER RESIN

FIG. 6

HONEYCOMB CERAMICS STRUCTURE BODY AND METHOD FOR PRODUCING THE SAME

TECHNICAL FIELD

The present invention relates to a honeycomb ceramics structure body which, for example, can attain a high collection efficiency with a low pressure loss and can be suitably used as a diesel particulate filter (DPF), and a method for producing the same.

BACKGROUND ART

In these years, the diesel particulate filters (DPFs) for collecting particulates discharged from diesel engines have been attracting attention, which are required to attain high collection efficiency with low pressure loss.

As DPFs, the honeycomb structure bodies made of cordierite have been conventionally used; in pursuit of such high collection efficiency with low pressure loss as described above, the improvement has hitherto been made in the honeycomb structure bodies as to the porosity and pore distribution thereof.

JP-A-9-77573 discloses a honeycomb structure having a specified the pore distribution on the surface of the partition walls with an enlarged porosity and an enlarged average pore size. JP-A-11-333293 describes honeycomb structure body having an enlarged porosity in addition to thin partition walls of a prescribed value or less.

In addition, JP-B-7-38930 discloses the production method for a honeycomb structure body having a high porosity by using a cordierite-forming raw material containing a talc powder and a silica powder each composed of coarser particles of a prescribed particle size or more. Japanese Patent No. 2726616 discloses a honeycomb structure body having a specified pore distribution and surface roughness in addition to a high porosity.

In the above described prior art, in order to increase the porosity, a cordierite-forming raw material is pulverized into coarse particles, graphite, wood powder, and a foaming agent are added as pore forming agents, or the like, but sufficiently satisfactory effects have not yet been obtained.

More specifically, when a cordierite-forming raw material is pulverized into coarse particles, the cordierite-forming reaction does not proceed to a sufficient extent, so that it is difficult to attain a low thermal expansion. When graphite is used as a pore forming agent, the following problems occur: the dielectric constant of a formed body with addition of graphite is decreased, so that it becomes difficult to perform a uniform drying of the formed body by the dielectric drying or the microwave drying with increase in addition amount of graphite. Furthermore, the firing period at the range from 800 to 1000° C. is to be so elongated in the firing process that it is necessary to suppress the rapid combustion of the graphite.

Moreover, when the starches or wood powders are used as the pore forming agent, it is necessary to add a large amount of water in order to make the body for ceramics attain a prescribed hardness in the kneading process, so that the efficiency in the drying process becomes poor; and in the firing process the starches and wood powders rapidly burn between 200 and 400° C. to release a large amount of heat, so that it is difficult to prevent the firing cracking. As above, in the prior art, it has been extremely difficult to increase the porosity beyond a prescribed value.

DISCLOSURE OF THE INVENTION

As a result of a diligent investigation performed in view of the above described problems in the prior art, the present inventors reached the present invention based on the findings that a very low pressure loss and a high collection efficiency can be attained when the porosity of the honeycomb structure body is increased to a prescribed value or more, and the total sum of the areas of the pores exposed on the partition wall surfaces is made to a prescribed value or more, with paying attention to the importance of the pore area on the partition wall surfaces with which surfaces the exhaust gas actually comes into contact and through which surfaces the exhaust gas passes.

In other words, according to the present invention, there is provided a honeycomb ceramics structure body having chemical composition of 42 to 56 wt % of $SiO_2$, 30 to 45 wt % of $Al_2O_3$ and 12 to 16 wt % of MgO, and the crystalline phase mainly composed of cordierite, characterized in that said honeycomb ceramics structure body has a porosity of 55 to 65%, an average pore size of 15 to 30 μm; and the total area of the pores exposed on the surfaces of the partition walls constituting the honeycomb ceramics structure body being 35% or more of the total area of the partition wall surfaces.

In the honeycomb ceramics structure body of the present invention, it is preferable that the total area of the pores exposed on the partition wall surfaces is 40% or more of the total area of the partition wall surfaces, and the average pore size is from 15 to 25 μm. Furthermore, it is preferable that the partition wall thickness is 300 μm or less. In addition, the permeability preferably is from 1.5 to 6 μm². It is also preferable that the coefficient of thermal expansion of the honeycomb ceramics structure body of the present invention between 40 and 800° C. is $0.5 \times 10^{-6}$/° C. or less.

The honeycomb ceramics structure body of the present invention can be suitably used as a diesel particulate filter (DPF) collecting the particulates discharged form a diesel engine.

In addition, according to the present invention, there is provided a method for producing a honeycomb ceramics structure body having chemical composition of 42 to 56 wt % of $SiO_2$, 30 to 45 wt % of $Al_2O_3$ and 12 to 16 wt % of MgO, the crystalline phase mainly composed of cordierite, a porosity of 55 to 65%, an average pore size of 15 to 30 μm; and the total area of the pores exposed on the surfaces of the partition walls constituting the honeycomb ceramics structure body being 35% or more of the total area of the partition wall surfaces, characterized in that 15 to 25 wt % of graphite and 5 to 15 wt % of a synthetic resin are added as a pore forming agent to a cordierite-forming raw material, the resultant is kneaded and molded into a honeycomb shape, and thus formed body is dried and fired to produce a honeycomb ceramics structure body.

In the above description, the synthetic resin is preferably any one of poly(ethylene terephthalate) (PET), poly(methyl methacrylate) (PMMA), and phenolic resin, or a combination thereof, and the average particle size of the raw material talc in the cordierite-forming raw material is preferably 50 μm or less and the average particle size of the raw material silica is 60 μm or less.

BEST MODE FOR CARRYING OUT THE INVENTION

The honeycomb ceramics structure body of the present invention has the chemical composition 42 to 56 wt % of $SiO_2$, 30 to 45 wt % of $Al_2O_3$, and 12 to 16 wt % of MgO, the crystalline phase mainly composed of cordierite, the porosity of 55 to 65%, the average pore size of 15 to 30 $\mu$m, and the total area of the pores exposed on the surface of the partition wall constituting the honeycomb ceramics structure body being 35% or more of the total area of the partition wall surface.

In the honeycomb ceramics structure body of the present invention, the porosity ranges from 55 to 65%. With the porosity below than 55%, the pressure loss of the exhaust gas is unpreferably increased, while with the porosity exceeding 65%, the mechanical strength of the honeycomb structure body is so remarkably degraded that the honeycomb structure body cannot be endurable to the actual use.

In addition, in this honeycomb ceramics structure body, the average pore size is 15 to 30 $\mu$m, and preferably from 15 to 25 $\mu$m. With the average pore size below than 15 $\mu$m, the collection efficiency is increased, but the pressure loss unpreferably becomes high. On the other hand, with the average pore size exceeding 30 $\mu$m, the pressure loss is satisfactorily low, but there occurs an increase in the probability that the particulates in the exhaust gas are not collected since they pass through the larger pores. In particular, when the wall thickness of the partition wall of the honeycomb ceramics structure body is 300 $\mu$m or less, the degradation of the collection efficiency becomes remarkable. In addition, when the average pore size exceeds 30 $\mu$m and the porosity is below 55%, the initial pressure loss is low, but with increasing time of use the pressure loss tends to increase sharply. It is considered that the particulates in the exhaust gas tend to be deposited in the interior of the partition wall by passing through the large pores, and there is caused an increase in the possibility that the deposited particulates remain unburned when renewed by combustion. In addition, it is also considered that even with a continuous renewal type honeycomb body supporting an oxidation catalyst on the partition wall surface, the particulates similarly remain unburned and are deposited in the interior of the partition wall to increase the pressure loss. Accordingly, it is more preferable that the average pore size falls within the range from 15 to 25 $\mu$m.

In addition, in the present invention, the total area of the pores exposed on the surface of the partition wall constituting the honeycomb ceramics structure body is 35% or more of the total area of the partition wall surface. In such a manner, by making the total area of the pores exposed on the surface of the partition wall be a prescribed value or more, a high collection efficiency can be attained with a very low pressure loss in relation to the exhaust gas. Incidentally, it is preferred that the total area of the pores exposed on the partition wall surface is 40% or more of the total area of the partition wall surface, and that it is 60% or less.

In addition, in the honeycomb ceramics structure body of the present invention, the permeability can be made to range from 1.5 to 6 $\mu$m$^2$. A honeycomb structure body having the permeability of this range can attain a high collection efficiency with a low pressure loss in relation to the exhaust gas.

Here, the permeability in the present specification means a numerical value obtained by the following formula 1:

$$C = \frac{8FTV}{\pi D^2 (P^2 - 13.839^2)/13.839 \times 68947.6} \times 10^8$$

"In the above formula, C denotes the permeability ($\mu$m$^2$), F the gas flow rate (cm$^3$/s), T the sample thickness (cm), V the gas viscosity (dynes·s/cm$^2$), D the sample diameter (cm), and P the gas pressure (PSI). In addition, as for the numerical values in the above formula, the following relations hold: 13.839 (PSI)=1 (atm), and 68947.6 (dynes/cm$^2$)=1 (PSI)."

In the honeycomb ceramics structure body of the present invention, the coefficient of thermal expansion between 40 and 800° C. can be made to 0.5×10$^{-6}$/° C. or less. With such a coefficient of thermal expansion, an excellent thermal shock resistance is exhibited, so that the honeycomb structure body will be hardly damaged even when sharp temperature changes repeatedly occur.

In addition, since as described above the honeycomb ceramics structure body of the present invention is high in collection efficiency, it can be suitably applied to a thin-wall honeycomb structure body having such a partition wall thickness of 300 $\mu$m or less.

Accordingly, the honeycomb ceramics structure body of the present invention having the above described constitution can be very preferably applied as a diesel particulate filter (DPF) collecting the particulates discharged from a diesel engine.

Then, description will be made on the method for producing a honeycomb ceramics structure body according to the present invention.

The honeycomb ceramics structure body according to the present invention can be produced through the following sequence of processes: firstly, a cordierite-forming raw material is prepared in which talc, kaoline, calcined kaoline, alumina, aluminum hydroxide, and silica are blended in such prescribed ratios that the chemical composition is within a range capable of containing 42 to 56 wt % of $SiO_2$, 30 to 45 wt % of $Al_2O_3$, and 12 to 16 wt % of MgO; 15 to 25 wt % of graphite and 5 to 15 wt % of a synthetic resin such as PET, PMMA, and phenolic resin are added as a pore forming agent, and methylcelluloses and a surfactant are added in the prescribed amounts to the raw material, and subsequently appropriate amount of water is added; the resultant mixture is kneaded to form a body for ceramics. Then, the body for ceramics is subjected to vacuum degassing, subsequently extruded into a honeycomb structure, dried by dielectric drying, microwave drying, or hot air drying, and subsequently fired within a temperature of 1400 to 1435° C. as a highest temperature, to produce the honeycomb ceramic structure body of the present invention.

In addition, the staggered pattern clogging of the end surfaces in the honeycomb ceramics structure body is performed after the drying process, or after the firing process where the honeycomb structure body is fired again.

The production method of the present invention is characterized in that, to the cordierite-forming raw material, 15 to 25 wt % of graphite is added as a pore forming agent, and simultaneously 5 to 15 wt % of a synthetic resin such as PET, PMMA, or phenolic resin all of which is low in heat flow during combustion are added. By doing so, it has become possible to produce, inexpensively and in a large scale, a cordierite honeycomb structure body having a porosity of 55% or more.

With the addition of graphite exceeding 25 wt % in relation to the cordierite-forming raw material, it is difficult to perform a uniform drying by the dielectric drying or the microwave drying, and simultaneously it is required that in the firing process, the combustion time within the range from 800 to 1000° C., in which range graphite is combusted, is required to be made longer so as to suppress the rapid combustion of the graphite. When the temperature rising rate in the combustion range of graphite is too large, graphite is combusted rapidly to result in a wide temperature distribution in the honeycomb structure body, involving a risk of generating cracks. In addition, when graphite remains unburned, it affects adversely the cordierite-forming reaction to be performed in a high temperature of 1200° C. or above, involving a risk of increasing the thermal expansion. Thus, in view of the industrial large-scale production, the addition amount of graphite is required to be 25 wt % or less, and is more preferably 20 wt % or less. The lower limit for the addition amount of graphite is required to be 15 wt % or more in view of the pore forming property and heat flow.

In the present invention, by adding a prescribed amount of a synthetic resin relatively low in heat flow during combustion to the graphite, it becomes possible to produce a honeycomb structure body having such a large porosity as is 55% or more.

In addition, in order to enlarge the total area of the pores exposed on the surface of the partition wall of a honeycomb structure body, as in the honeycomb ceramics structure body of the present invention, it is necessary to increase the porosity and simultaneously it is also necessary to control the pores formed by talc and silica in the process of the cordierite-forming reaction. When the talc raw material or the silica raw material is made to be coarse particles, it is possible to make the average pore size be larger, but the formed pores do not necessarily appear on the partition wall surfaces, and it results in the formation of coarse pores in the interior of the partition walls. This is because the coarse particles tend to gather together, during extrusion, in the central part of the partition wall.

Thus, in the present invention, it becomes possible to form pores effectively on the surface of the partition walls by controlling the average particle size of the talc raw material to 50 $\mu$m or less and the average particle size of the silica raw material to 60 $\mu$m or less, both material being important for forming pores; consequently, the ratio of the total area of the pores exposed on the surfaces of the partition walls in a honeycomb structure body to the total area of the partition wall surfaces can be made to be 35% or more. Moreover, it is more preferable that the average particle size of the talc raw material is within the range of from 20 to 50 $\mu$m and the average particle size of the silica raw material is within the range of from 20 to 60 $\mu$m.

Description will be made below on the present invention on the basis of the specific Examples, but the present invention is not limited to these Examples.

EXAMPLES 1 TO 11 AND COMPARATIVE EXAMPLES 1 TO 16

The cordierite-forming raw materials and pore forming agents shown in Table 1 were blended in the respective content ratios shown in Table 2; to the mixtures thus obtained methylcellulose and hydroxypropoxyl methylcellulose were added by 2 wt %, respectively, then a fatty acid soap was added as a surfactant by 0.5 wt %, and further an appropriate amount of water was added, to form respective puddles. Then, using these puddles, as shown in Table 3, a series of honeycomb structure bodies of $\phi$150 mm×150 mm (length) were extruded, where the cell structure was such that either the wall thickness was 300 $\mu$m and the number of the cells 31 cells/cm$^2$, or the wall thickness was 430 $\mu$m and the number of the cells 16 cells/cm$^2$. The respective extruded bodies were subjected to the dielectric drying and hot air drying to remove water. Then, the formed body was fired under the conditions that the highest temperature was 1415° C. and the retention time at the highest temperature was 8 hours; both end faces were clogged alternately in a staggered pattern with a slurry-like cordierite-forming raw material, then the respective formed bodies were again fired with the highest temperature of 1420° C., and thus respective honeycomb ceramics structure bodies as an evaluation sample were produced.

The physical properties and evaluation results for the honeycomb structure bodies thus obtained are shown in Table 3.

TABLE 1

| Raw material | Average grain size ($\mu$m) | Chemical analysis (%) | | | | | | |
|---|---|---|---|---|---|---|---|---|
| | | IgLoss | SiO$_2$ | Al$_2$O$_3$ | Fe$_2$O$_3$ | TiO$_2$ | MgO | CaO + Na$_2$O + K$_2$O |
| Main raw material | | | | | | | | |
| Talc A | 25 | 5.5 | 62 | 0.15 | 1.75 | 0.005 | 31 | 0.15 |
| Talc B | 45 | 5 | 63 | 0.1 | 0.02 | 0 | 31.5 | 0.5 |
| Talc C | 25 | 6.5 | 59.5 | 0.7 | 2.5 | 0.02 | 30.5 | 0.02 |
| Talc D | 35 | 4.8 | 62.5 | 0.2 | 0.4 | 0.01 | 31.7 | 0.1 |
| Talc E | 55 | 5 | 63 | 0.1 | 0.02 | 0 | 31.5 | 0.5 |
| Calcined talc | 25 | 0 | 66.3 | 0.1 | 0.0 | 0.0 | 33.2 | 0.5 |
| Kacline A | 9 | 14 | 45.5 | 39 | 0.2 | 0.7 | 0.01 | 0.09 |
| Kaoline B | 4 | 13.5 | 46 | 39 | 0.4 | 0.9 | 0.02 | 0.1 |
| Kaoline C | 5 | 14 | 45.5 | 39 | 0.3 | 0.7 | 0.01 | 0.1 |
| Alumina | 6 | 0.05 | 0.02 | 99.5 | 0.02 | 0 | 0 | 0.2 |
| Aluminum hydroxide A | 1 | 34 | 0 | 65.5 | 0 | 0 | 0 | 0.35 |
| Aluminum hydroxide B | 2 | 34 | 0.05 | 65.5 | 0 | 0 | 0 | 0.3 |
| Silica A | 20 | 0.1 | 99.8 | 0.02 | 0.02 | 0 | 0 | 0.02 |
| Silica B | 110 | 0.1 | 99.7 | 0.1 | 0 | 0 | 0 | 0.01 |
| Silica C | 40 | 0.1 | 99.8 | 0.1 | 0.02 | 0 | 0 | 0.01 |

TABLE 1-continued

| Raw material | Average grain size (μm) | Chemical analysis (%) | | | | | | |
|---|---|---|---|---|---|---|---|---|
| | | IgLoss | SiO$_2$ | Al$_2$O$_3$ | Fe$_2$O$_3$ | TiO$_2$ | MgO | CaO + Na$_2$O + K$_2$O |
| Silica D | 50 | 0.1 | 99.8 | 0.02 | 0.02 | 0 | 0 | 0.02 |
| Fused silica | 42 | 0.1 | 99.8 | 0.1 | 0.02 | 0 | 0 | 0.01 |
| Pore forming agent | | | | | | | | |
| Graphite | 40 | 99.5 | | | 0.2 | | | |
| PET | 60 | 99.9 | | | | | | |
| PMMA | 60 | 99.9 | | | | | | |
| Phenolic resin | 60 | 99.8 | | | | | | |
| Cornstarch | 60 | 99.8 | | | | | | |
| Walnut powder | 150 | 99.8 | | | | | | |

TABLE 2

| Batch No. | Blending composition of cordierite-forming raw material (wt %) | | | | | | | | | Average grain size of raw material (μm) | |
|---|---|---|---|---|---|---|---|---|---|---|---|
| | Talc | Calcined talc | Kaoline | Calcined kaoline | Alumina | Aluminum hydroxide | Silica | Fused silica | Pore forming agent (wt %) | Talc raw material | Silica raw material |
| 1 | B: 28 | 10 | B: 14 | 10 | 11.5 | A: 16.5 | C: 10 | 0 | Graphite: 20 | 43 | 40 |
| 2 | A: B(1:1) 41 | 0 | B: 16 | 0 | 15 | B: 16 | A: 12 | 0 | Graphite: 20 | 35 | 20 |
| 3 | A: 41 | 0 | B: 16 | 0 | 15 | B: 16 | A: 12 | 0 | Graphite: 20 | 25 | 20 |
| 4 | A: B(1:1) 41 | 0 | C: 16 | 0 | 15 | B: 16 | B: 12 | 0 | Graphite: 20 | 35 | 50 |
| 5 | A: 41 | 0 | B: 16 | 0 | 15 | B: 16 | B: D(5:7) 12 | 0 | Graphite: 20 | 25 | 75 |
| 6-1 | A: 40 | 0 | A: 17 | 0 | 15 | A: 16 | 0 | 12 | Graphite: 30 | 25 | 42 |
| 6-2 | A: 40 | 0 | A: 17 | 0 | 15 | A: 16 | 0 | 12 | Graphite: 20 + cornstarch: 10 | 25 | 42 |
| 6-3 | A: 40 | 0 | A: 17 | 0 | 15 | A: 16 | 0 | 12 | Graphite: 20 + walnut powder: 10 | 25 | 42 |
| 6 | A: 40 | 0 | A: 17 | 0 | 15 | A: 16 | 0 | 12 | Graphite: 15 + PET: 15 | 25 | 42 |
| 7 | C: 39 | 0 | B: 15 | 0 | 15 | B: 17 | B: 3 | 11 | Graphite: 15 + PET: 15 | 25 | 57 |
| 8 | B: 39 | 0 | B: 14 | 0 | 15 | B: 17 | B: 4 | 11 | Graphite: 15 + PET: 15 | 50 | 60 |
| 9 | A: 39 | 0 | B: 15 | 0 | 15 | B: 17 | B: 3 | 11 | Graphite: 15 + PET: 15 | 25 | 57 |
| 10 | B: 39 | 0 | B: 14 | 0 | 15 | B: 17 | B: 4 | 11 | Graphite: 15 + PET: 15 | 35 | 60 |
| 11 | B: C(1:1) 39 | 0 | B: 14 | 0 | 15 | B: 17 | B: 4 | 11 | Graphite: 15 + PET: 15 | 38 | 60 |
| 12 | C: 41 | 0 | B: 16 | 0 | 15 | A: 16 | A: 12 | 0 | Graphite: 20 + PET: 10 | 25 | 20 |
| 13 | C: 41 | 0 | B: 16 | 0 | 15 | A: 16 | A: 12 | 0 | Graphite: 20 + PMMA: 10 | 25 | 20 |
| 14 | C: 41 | 0 | B: 16 | 0 | 15 | A: 16 | A: 12 | 0 | Graphite: 20 + phenolic resin: 10 | 25 | 20 |
| 15 | C: 40 | 0 | B: 17 | 0 | 15 | A: 16 | 0 | 12 | Graphite: 20 + PET: 10 | 25 | 42 |
| 16 | C: 41 | 0 | B: 16 | 0 | 15 | A: 16 | A: 12 | 0 | Graphite: 20 + PET: 10 | 25 | 20 |
| 17 | E: 41 | 0 | B: 16 | 0 | 15 | A: 16 | A: 12 | 0 | Graphite: 20 + PET: 10 | 55 | 20 |
| 18 | C: 41 | 0 | B: 16 | 0 | 15 | A: 16 | B: D(1:1) 12 | 0 | Graphite: 20 + PET: 10 | 25 | 80 |
| 19 | E: 41 | 0 | B: 16 | 0 | 15 | A: 16 | B: D(1:1) 12 | 0 | Graphite: 20 + PET: 10 | 55 | 80 |
| 20 | A: 41 | 0 | B: 16 | 0 | 15 | A: 16 | A: 12 | 0 | Graphite: 20 | 25 | 20 |
| 21 | A: 40 | 0 | B: 20 | 0 | 14 | A: 16 | A: 10 | 0 | Graphite: 20 | 25 | 20 |

,1/64

TABLE 3

| NO. | Dough | Wall thickness (μm) | Number of cells (cells/cm$^2$) | CTE | Average pore size (μm) | Porosity (%) | Area ratio (%) | Initial pressure loss (mmHg) | Collection efficiency (%) | Permeability (μm$^2$) |
|---|---|---|---|---|---|---|---|---|---|---|
| Comparative Example | | | | | | | | | | |
| 1 | Batch 1 | 300 | 31 | 0.9 | 25 | 52 | 25 | 80 | 90 | 4.1 |
| 2 | Batch 2 | 300 | 31 | 0.5 | 30 | 50 | 23 | 85 | 95 | 5.3 |
| 3 | Batch 3 | 300 | 31 | 0.3 | 16 | 54 | 30 | 85 | 95 | 1.4 |
| 4 | Batch 4 | 300 | 31 | 0.8 | 30 | 55 | 32 | 80 | 90 | 6.1 |
| 5 | Batch 5 | 300 | 31 | 0.4 | 35 | 50 | 20 | 70 | 80 | 7.6 |
| 6 | Batch 6-1 | 300 | 31 | Measurement was impossible because of the cracks generated in the firing process. | | | | | | |
| 7 | Batch 6-2 | 300 | 31 | | | | | | | |
| 8 | Batch 6-3 | 300 | 31 | | | | | | | |
| Example | | | | | | | | | | |
| 1 | Batch 6 | 300 | 31 | 0.4 | 25 | 63 | 45 | 65 | 95 | 4.8 |
| 2 | Batch 7 | 300 | 31 | 0.4 | 28 | 60 | 41 | 60 | 95 | 6.0 |
| 3 | Batch 8 | 300 | 31 | 0.5 | 23 | 62 | 43 | 55 | 90 | 4.1 |
| 4 | Batch 9 | 300 | 31 | 0.3 | 28 | 60 | 43 | 65 | 95 | 5.9 |

TABLE 3-continued

| NO. | Dough | Wall thickness ($\mu$m) | Number of cells (cells/cm$^2$) | CTE | Average pore size ($\mu$m) | Porosity (%) | Area ratio (%) | Initial pressure loss (mmHg) | Collection efficiency (%) | Permeability ($\mu$m$^2$) |
|---|---|---|---|---|---|---|---|---|---|---|
| 5 | Batch 10 | 300 | 31 | 0.3 | 23 | 62 | 43 | 60 | 95 | 4.0 |
| 6 | Batch 11 | 300 | 31 | 0.4 | 26 | 62 | 42 | 65 | 90 | 5.3 |
| 7 | Batch 12 | 300 | 31 | 0.3 | 17 | 55 | 35 | 75 | 95 | 1.9 |
| 8 | Batch 13 | 300 | 31 | 0.5 | 15 | 56 | 36 | 70 | 95 | 1.5 |
| 9 | Batch 14 | 300 | 31 | 0.3 | 17 | 57 | 39 | 70 | 95 | 2.1 |
| 10 | Batch 15 | 300 | 31 | 0.3 | 20 | 60 | 40 | 65 | 90 | 3.0 |
| 11 | Batch 16 | 300 | 31 | 0.3 | 20 | 58 | 38 | 65 | 90 | 2.9 |
| Comparative Example | | | | | | | | | | |
| 9 | Batch 17 | 300 | 31 | 0.6 | 32 | 56 | 34 | 60 | 85 | 7.0 |
| 10 | Batch 18 | 300 | 31 | 0.7 | 35 | 55 | 33 | 60 | 80 | 8.3 |
| 11 | Batch 19 | 300 | 31 | 0.9 | 38 | 53 | 29 | 50 | 70 | 9.6 |
| 12 | Batch 20 | 300 | 31 | 0.3 | 14 | 54 | 26 | 85 | 95 | 1.3 |
| 13 | Batch 21 | 300 | 31 | 0.2 | 10 | 53 | 22 | 95 | 95 | 1.0 |
| 14 | Batch 12 | 430 | 16 | 0.3 | 17 | 55 | 35 | 95 | 98 | 2.0 |
| 15 | Batch 13 | 430 | 16 | 0.4 | 15 | 56 | 36 | 90 | 98 | 1.6 |
| 16 | Batch 15 | 430 | 16 | 0.3 | 20 | 60 | 40 | 85 | 95 | 2.9 |

Here, the measurements of the average pore size, porosity, ratio of the total area of the pores exposed on the partition wall surfaces to the total area of the partition wall surfaces (area ratio), permeability, coefficients of thermal expansion between 40 and 800° C. (CTE), pressure loss, and collection efficiency of a honeycomb ceramics structure body were performed as follows.

The average pore size and the porosity were obtained from the pore distribution measured by the mercury intrusion method. The porosity was calculated from the total pore volume.

Area ratio: the area ratio of the pores exposed on the partition wall surfaces was obtained by analyzing a photograph of the partition wall surfaces obtained by the SEM observation using an image analysis apparatus.

CTE: the measurement was made with the differential measurement method using a quartz standard specimen.

Permeability: a portion of the partition wall was cut out from a honeycomb ceramics structure body, and was so processed that the concavities and convexities were removed to prepare a test sample; the sample was so placed between a pair of members of the sample holder of ϕ20 mm that no gas leaks, with one member in contact with the top face of the test sample and the other in contact with the bottom face of the test sample, and then a gas was made to flow into the sample holder at a specified gas pressure; and the permeability was obtained from the gas amount which passed through the test sample on the basis of the following formula 1:

$$C = \frac{8FTV}{\pi D^2 (P^2 - 13.839^2)/13.839 \times 68947.6} \times 10^8$$

"In the above formula, C denotes the permeability ($\mu$m$^2$), F the gas flow rate (cm$^3$/s), T the sample thickness (cm), V the gas viscosity (dynes·s/cm$^2$), D the sample diameter (cm), and P the gas pressure (PSI). In addition, as for the numerical values in the above formula, the following relations hold: 13.839 (PSI)=1 (atm), and 68947.6 (dynes/cm$^2$)=1 (PSI)."

Pressure loss: soot was generated using a light oil gas burner, and a DPF was arranged at a position downstream of the burner; the combustion gas containing the soot was made to flow into the DPF at the gas flow rate of 2.4 Nm$^3$/min and the temperature of about 150° C.; and the pressure loss was obtained from the time variation of the pressure difference between before and after the DPF measured while the soot was being deposited in the DPF.

Collection efficiency: soot was generated using a light oil gas burner, and a DPF was arranged at a position downstream of the burner; the combustion gas containing the soot was made to flow into the DPF at the gas flow rate of 2.4 Nm$^3$/min and the temperature of about 150° C.; and the collection efficiency was obtained from the weight ratio between the soot weights in the definite fractional gas flows respectively branched from the gas flow respectively at some positions upstream and downstream of the DPF.

(Discussion)

Figure 1:
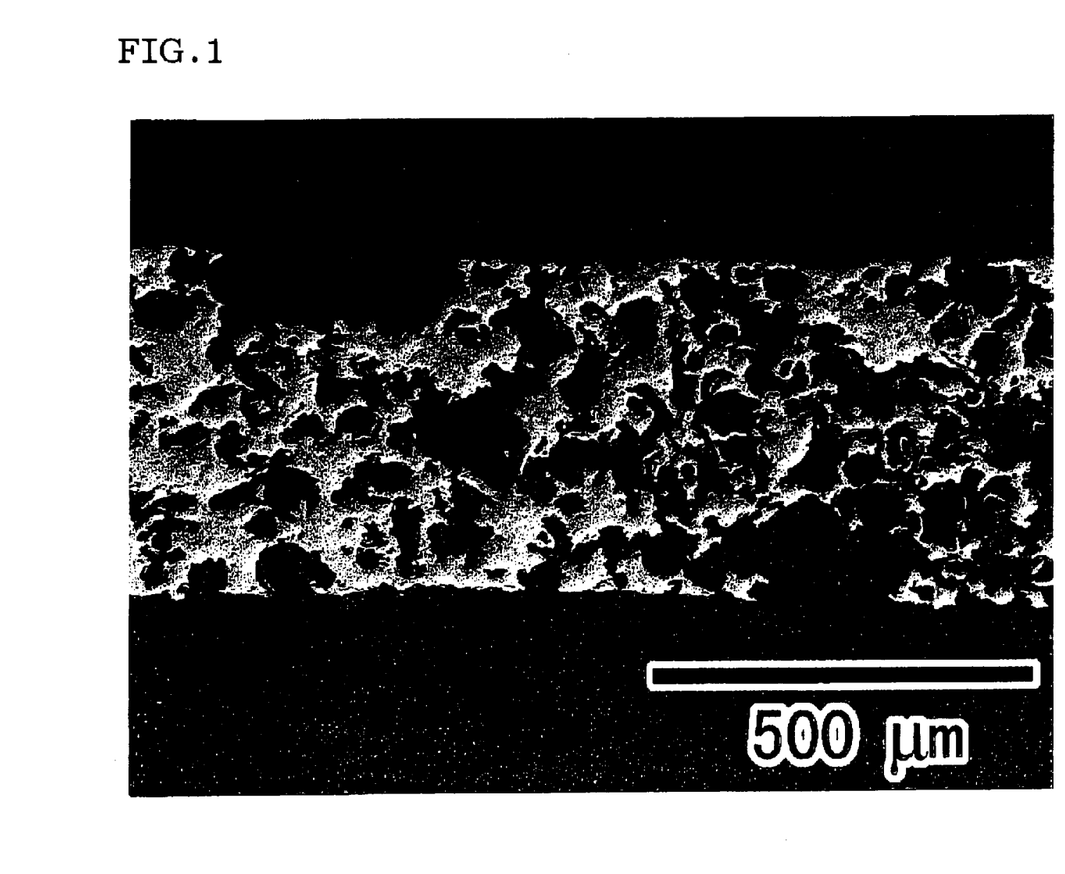
FIG. 1 shows a SEM photograph of the rib section in the honeycomb ceramics structure body of Example 1.
Figure 2:
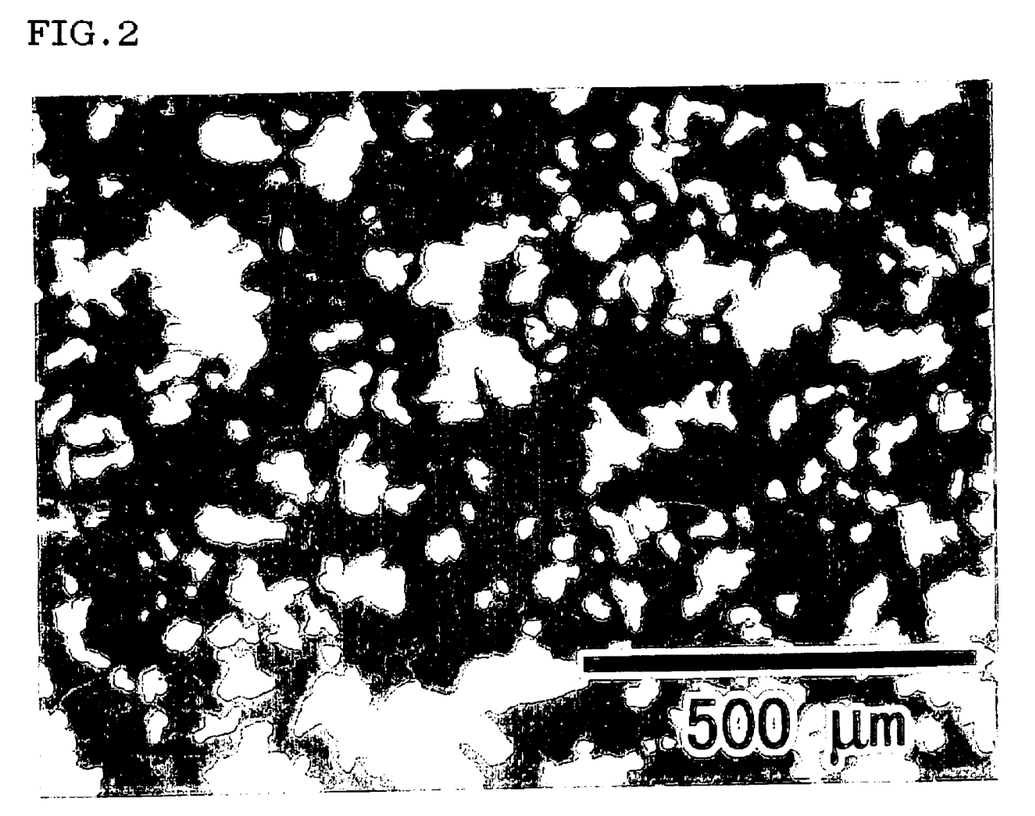
FIG. 2 shows a SEM photograph of the surface of the partition wall (membrane surface) in the honeycomb ceramics structure body of Example 1.

FIG. 1 shows a SEM photograph of the rib section of the honeycomb ceramics structure body of Example 1, and FIG. 2 shows a SEM photograph of the partition wall surface (membrane surface) of the honeycomb ceramics structure body of Example 1.

Figure 3:
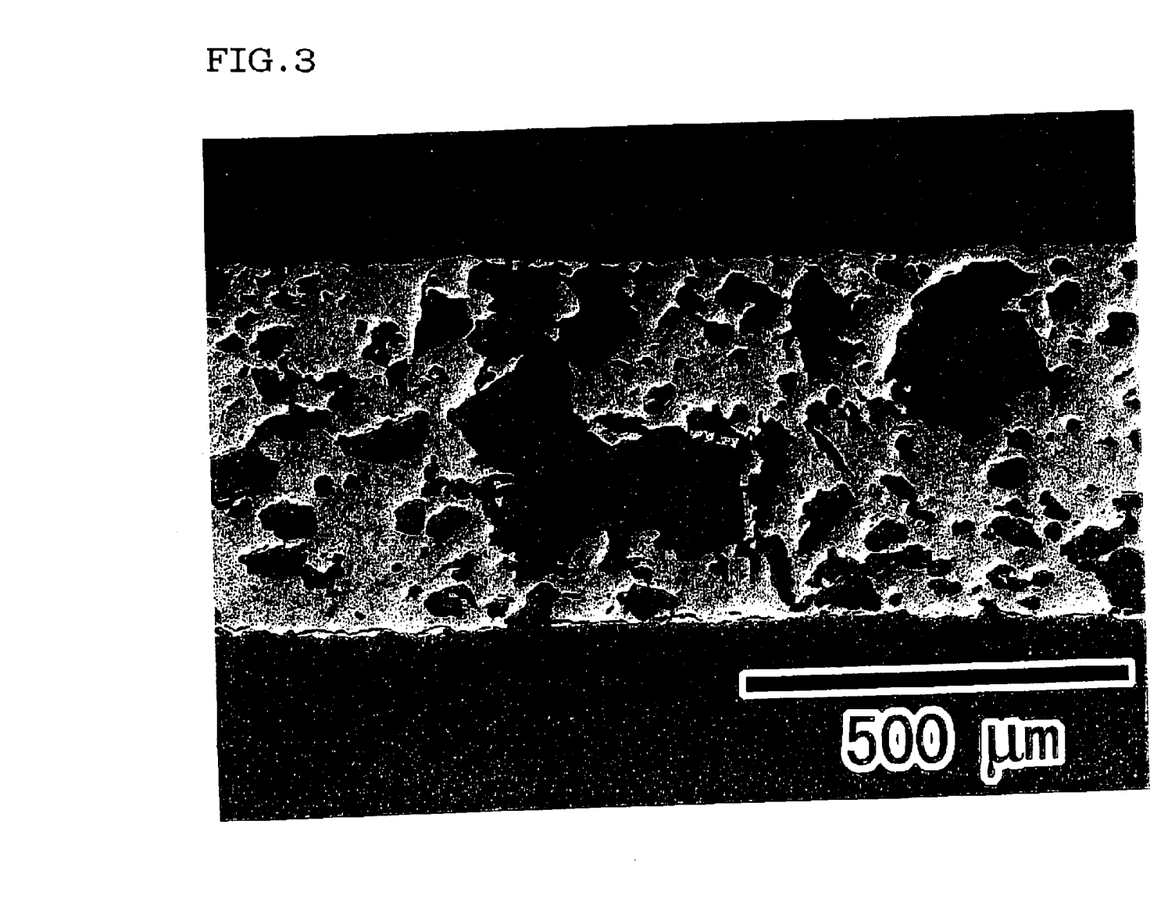
FIG. 3 shows a SEM photograph of the rib section in the honeycomb ceramics structure body of Example 5.
Figure 4:
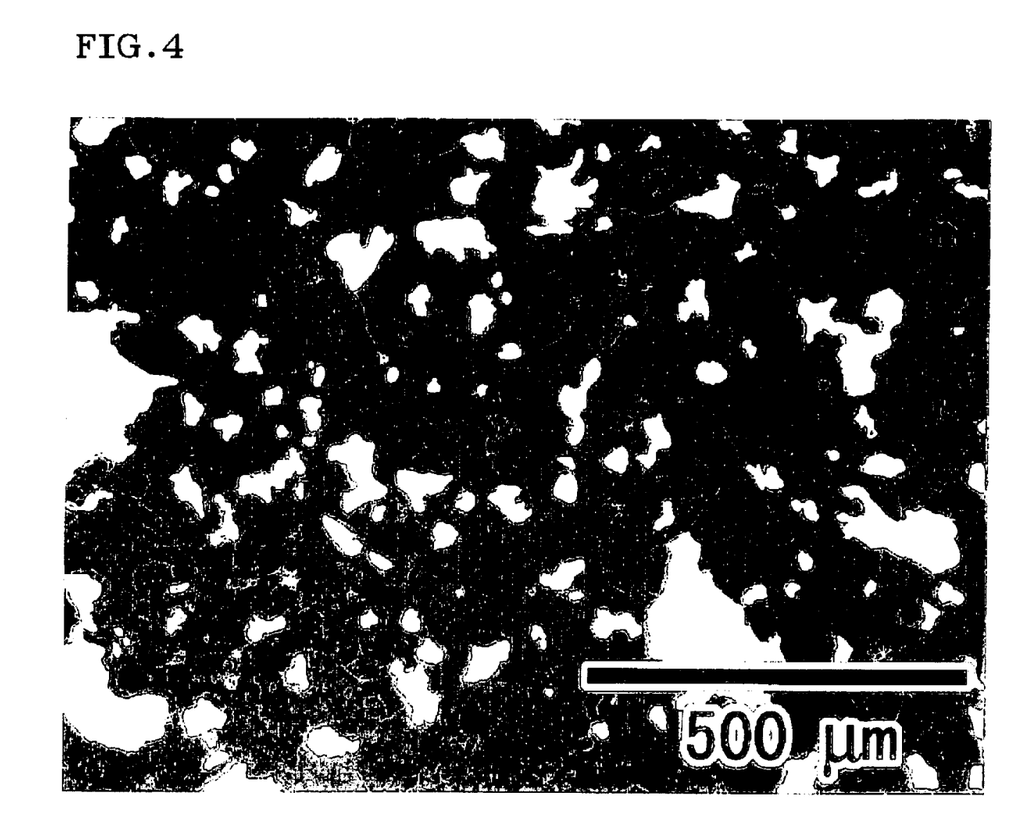
FIG. 4 shows a SEM photograph of the surface of the partition wall (membrane surface) in the honeycomb ceramics structure body of Example 5.

In addition, FIG. 3 shows a SEM photograph of the rib section of the honeycomb ceramics structure body of Comparative Example 5, and FIG. 4 shows a SEM photograph of the partition wall surface (membrane surface) of the honeycomb ceramics structure body of Comparative Example 5.

In the two photographs of FIGS. 2 and 4, the white looking areas (the yellow looking areas in the photographs substituted for drawings) are the pores exposed on the partition wall surface (surface pores). The high area ratio of the surface pores leads to the decrease of the initial pressure loss.

FIGS. 3 and 4 show the fine structure of the honeycomb structure body of Comparative Example 5.

From the photographs of FIGS. 3 and 4, it can be seen that in the rib section of Comparative Example 5, very large pores gather together near the central part of the rib, owing to the use of the silica raw material comprising coarse particles having the average particle size of 75 $\mu$m. Large pores are known to be formed by use of coarse particle raw material of talc or silica; however, the coarse raw material particles gather together near the central part of the ribs when the honeycomb structure is formed by extrusion, and hence the large pores are formed only in the central part of the ribs. In the photograph of the membrane surface of Comparative Example 5, the total area of the pores exposed on the partition wall surfaces was only 20%. Comparative Example 5 is not so high in pressure loss, but the collection efficiency is as poor as 80% owing to the effect ascribable to the large pores.

In Example 1 as shown in FIGS. 1 and 2, a synthetic resin of PET was used as a pore forming agent together with graphite in order to increase the porosity. As a result, the porosity became as high as 63%. It was also confirmed that the use of a synthetic resin had the effects of increasing the porosity of the honeycomb structure body, and simultaneously increasing the surface pores as can be seen from the appearance of the top end face and that of the bottom end face of the rib section in FIG. 1. When the photograph of FIG. 2 was subjected to the image analysis, the area ratio of the surface pores in Example 1 was found to be as high as 45%, and consequently, as shown in Table 3, the permeability was 4.8 $\mu m^2$, the initial pressure loss was suppressed to a very low level of 65 mmHg, and the collection efficiency reached a level as high as 95%.

Figure 5:
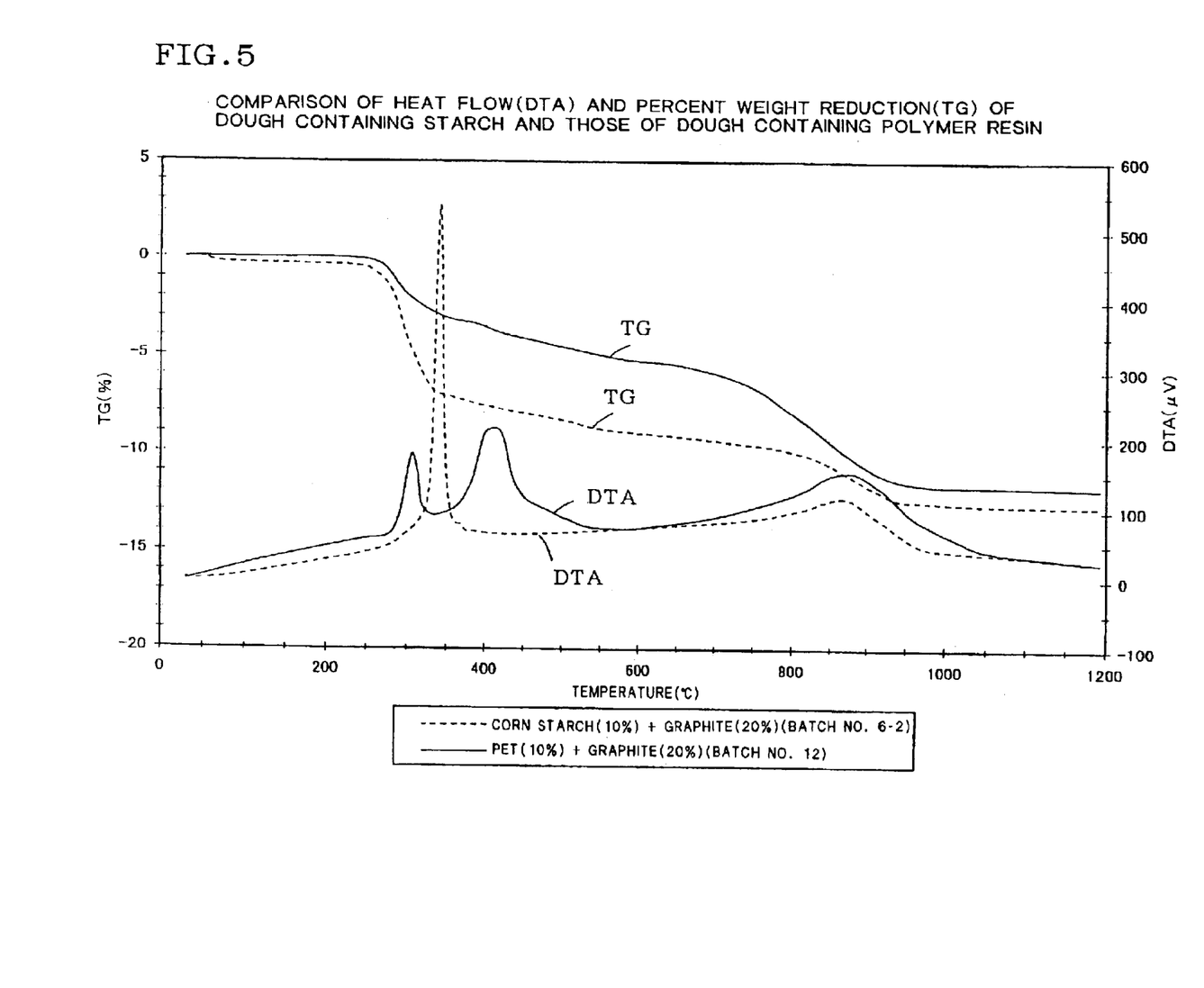
FIG. 5 is a graph showing the relationships between percent weight reductions (TG) and heat flows (DTA) of the samples from Comparative Example 7 and Example 7.

Conventionally, starch and the like have been used as the pore forming agents substituting for graphite, but when used in a large amount, there occurs a problem that "fissure" is generated in the drying process, firing process, and the like. FIG. 5 shows the relationship between the percent weight reduction (TG) and heat flow (DTA) in the dough (Comparative Example 7: batch 6-2) containing starch (cornstarch) in 10 wt % and graphite in 20 wt %, and that in the dough (Example 7: batch 12) containing a synthetic resin (PET) in 10 wt % and graphite in 20 wt %.

As can be seen from FIG. 5, when starch was used as a pore forming agent, the starch was thermally decomposed around the temperature range from 300° C. to 350° C. to sharply release heat (see the dotted line for DTA), and the resulting thermal stress generated the fissure in the firing process. However, there was found an advantage that when PET, PMMA, phenolic resin, crosslinked polystyrene, or the like was used as a pore forming agent, the heat flow in the concerned temperature range was suppressed to such a low level (see the solid line for DTA) that the fissure was very scarcely generated in the firing process.

Figure 6:
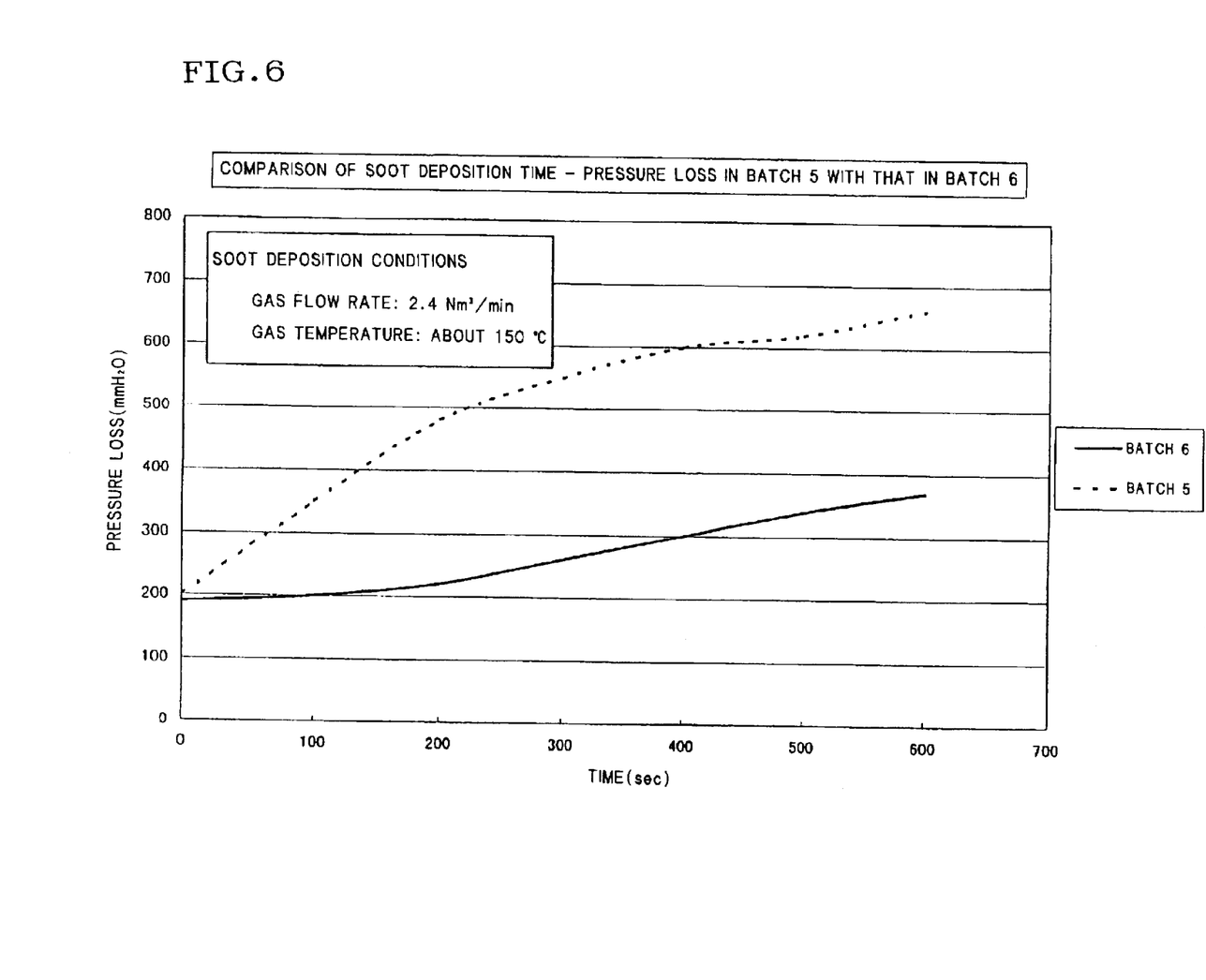
FIG. 6 is a graph showing the relationship between the soot deposition time and the pressure loss.

FIG. 6 is a graph showing the relationships between the soot deposition time and the pressure loss.

In FIG. 6, the solid line shows the result for the honeycomb structure body of Example 1, and the broken line in FIG. 4 shows the result for the honeycomb structure body of Comparative Example 5.

The conditions for the soot deposition were that a light oil gas burner was used to generate a gas having a temperature of about 150° C., and the gas thus generated was made to flow into the DPFs made of the honeycomb structure bodies of Example 1 and Comparative Example 5 at a gas flow rate set of 2.4 $Nm^3$/min.

As can be seen from the results shown in FIG. 6, for the honeycomb structure body of Example 1 in which the porosity was 63% and the area ratio was as large as 45%, the pressure loss rise did not become large even after a prescribed elapsed time, whereas for the honeycomb structure body of Comparative Example 5 in which the porosity was 50% and the area ratio was as small as 20%, the pressure loss rise became large with elapsing time.

INDUSTRIAL APPLICABILITY

As described above, according to the present invention, it is possible to provide a honeycomb ceramics structure body which can attain a low pressure loss and a high collection efficiency, and a method for producing the same.

What is claimed is:

1. A honeycomb ceramics structure body having chemical composition of 42 to 56 wt % of $SiO_2$, 30 to 45 wt % of $Al_2O_3$ and 12 to 16 wt % of MgO, and a crystalline phase mainly composed of cordierite, wherein said honeycomb ceramics structure body has a porosity of 55 to 65%, an average pore size of 15 to 30 $\mu m$; and a total area of the pores exposed on surfaces of partition walls constituting the honeycomb ceramics structure body being 35% or more of the total area of the partition wall surfaces.

2. The honeycomb ceramics structure body according to claim 1 in which the total area of the pores exposed on the surface of the partition wall is 40% or more of the total area of said partition wall surface.

3. The honeycomb ceramics structure body according to claim 1 in which the average pore size is from 15 to 25 $\mu m$.

4. The honeycomb ceramics structure body according to claim 1 in which a thickness of the partition wall is 300 $\mu m$ or less.

5. The honeycomb ceramics structure body according to claim 1 in which the permeability is from 1.5 to 6 $\mu m^2$.

6. The honeycomb ceramics structure body according to claim 1 in which the coefficient of thermal expansion between 40 and 800° C. is $0.5 \times 10^{-6}$/° C. or less.

7. The honeycomb ceramics structure body according to claim 1, which can be used as a diesel particulate filter.

8. A method for producing a honeycomb ceramics structure body having chemical composition of 42 to 56 wt % of $SiO_2$, 30 to 45 wt % of $Al_2O_3$ and 12 to 16 wt % of MgO, a crystalline phase mainly composed of cordierite, a porosity of 55 to 65%, an average pore size of 15 to 30 $\mu m$; and a total area of a pores exposed on surfaces of partition walls constituting the honeycomb ceramics structure body being 35% or more of the total area of the partition wall surfaces, wherein 15 to 25 wt % of graphite and 5 to 15 wt % of a synthetic resin are added as a pore forming agent to a cordierite-forming raw material, a resultant is kneaded and molded into a honeycomb shape, and thus formed body is dried and fired to produce a honeycomb ceramics structure body.

9. The method for producing a honeycomb ceramics structure body according to claim 8 wherein the synthetic resin is any one of poly(ethylene terephthalate) (PET), poly(methyl methacrylate) (PMMA), crosslinked polystyrene, and phenolic resin, or a combination thereof.

10. The method for producing a honeycomb ceramics structure body according to claim 8, wherein [the average particle size of the raw material talc is 50 $\mu m$ or less, and the average particle size of the raw material silica is 60 $\mu m$ or less, in] the cordierite-forming raw material comprises talc having an average particle size of 50 $\mu m$ or less and silica having an average particle size of 60 $\mu m$ or less.

* * * * *